(12) United States Patent
Parekh et al.

(10) Patent No.: US 7,219,142 B1
(45) Date of Patent: May 15, 2007

(54) SCOPING OF POLICIES IN A HIERARCHICAL CUSTOMER SERVICE MANAGEMENT SYSTEM

(75) Inventors: Pankaj Parekh, Fremont, CA (US); Sandeep Gupta, Delhi (IN); Vijay Mamtani, New Delhi (IN); Atul Jain, Noida (IN); Sanjay K. Aggarwal, Noida (IN)

(73) Assignee: iPolicy Networks, Inc., Fremont, CA (US)

( * ) Notice: Subject to any disclaimer, the term of this patent is extended or adjusted under 35 U.S.C. 154(b) by 740 days.

(21) Appl. No.: 10/277,197

(22) Filed: Oct. 21, 2002

(51) Int. Cl.
*G06F 15/16* (2006.01)
(52) U.S. Cl. ..................... 709/223; 709/225
(58) Field of Classification Search ........ 709/223–224, 709/225, 229, 200–203, 217–222, 226–227; 726/1
See application file for complete search history.

(56) References Cited

U.S. PATENT DOCUMENTS

| | | | |
|---|---|---|---|
| 6,577,628 B1 * | 6/2003 | Hejza | 370/392 |
| 6,816,907 B1 * | 11/2004 | Mei et al. | 709/229 |
| 7,058,704 B1 * | 6/2006 | Mangipudi et al. | 709/223 |
| 2002/0016840 A1 * | 2/2002 | Herzog et al. | 709/225 |
| 2002/0138631 A1 * | 9/2002 | Friedel et al. | 709/229 |
| 2003/0023587 A1 * | 1/2003 | Dennis et al. | 707/3 |
| 2003/0065762 A1 * | 4/2003 | Stolorz et al. | 709/223 |
| 2006/0005229 A1 * | 1/2006 | Palekar et al. | 726/1 |

* cited by examiner

*Primary Examiner*—Moustafa M. Meky
(74) *Attorney, Agent, or Firm*—William L. Botjer

(57) ABSTRACT

The present invention is a system and method for allowing an administrator of a computer network higher up in a hierarchical arrangement to define the scope of policies for the services offered, and users lower in the hierarchical arrangement to customize policies within the scope defined by the administrator. While defining policy rules, administrators classify them as scoping or non-scoping. Users lower in the hierarchical arrangement can then customize scoping rules by defining sub-rules. Policy rules have a condition part and an action part, and the sub-rules can be used to change the scope of the condition and action parts. The present invention adds all the non-scoping policy rules, all the scoping policy rules, and all the sub-rules (with their scope limited by the scoping rules) to a rules database. This rules database is then used by any policy enforcement engine to enforce policy rules.

14 Claims, 5 Drawing Sheets

| Rule no. | Source IP Address | Destination IP Address | Application | Direction | Time | FW Action | Policy enforcement portion |
|---|---|---|---|---|---|---|---|
| 1 | Any | 192.10.1.1<br>192.10.1.2<br>192.10.1.3 | HTTP | In | Any | Allow | |
| 1.1 | 172.1.3.5 | 192.10.1.1 | HTTP | In | Any | Allow | Allow |
| 1.2 | Any | 192.10.1.2<br>192.10.1.3 | HTTP | In | Any | Reject | Default (Reject)<br>Default (Reject) |
| 1.3 | Any | 192.10.1.1 | HTTP | In | 9.00 am to 10.00 am | Allow | Allow |
| 1.4 | Any | 192.10.1.1<br>192.20.1.1 | HTTP | In | Any | Allow | Allow<br>Default (Reject) |

FIG. 3

SCOPING OF POLICIES IN A HIERARCHICAL CUSTOMER SERVICE MANAGEMENT SYSTEM

BACKGROUND

The present invention relates to Service Management Systems for computer networks. In particular, the present invention provides a Service Management Platform that allows an administrator higher up in a hierarchical arrangement to define the scope of policies for the services offered, and users lower in the hierarchical arrangement to customize the policies within the scope of policies thus defined by the administrator.

Managed Service Providers (MSPs) offer managed network services to their customers. They offer services such as firewall, intrusion detection and protection, anti-virus protection, virtual private network etc. to their customers, and manage these for their customers.

The managed services offered by MSPs today differ from MSP to MSP. It may, at minimum, be co-locations of servers and/or network equipment of the customer at the MSP location and accesses to them for the customer. Or, it may be the installation and management of equipment and servers for the customer by the MSP, or even managing policies and/or rules for the customer.

One of the major issues that MSPs face in managing services for the customers is the issue of how much control the MSP has and how much is available to the customer. While it is of utmost importance to the MSP to keep control over the service being offered to the customer, if they want to provide any service guarantees to the customer, this becomes an operational issue for both the service providers as well as customers. This is because if the customer has to approach the MSP for any customization in the service or any change in rules/policies, it would lead to delay and operational costs for both MSP and the customer.

The same reasoning applies for enterprise deployment as well. Since most multi-site (and/or multi-department) enterprises have multiple security devices with consistent security policies, these consistent security policies are maintained through communication means such as email, document sharing, paper guidelines, etc. These means, however, do not allow the global security policy to be enforced consistently without manual communication processes.

To overcome the above issues, MSP and enterprise administrators need a mechanism such that they can define service rules and allow customers/location administrators to redefine the rules within the scope of the service rules.

In the past, solutions have been developed that allow the customers some level of management. However, all these solutions have worked on principle of either partitioning the functionality of management, or allowing customers to only do a subset of the management operations that an MSP could do. Further, in some solutions, the monitoring aspects of management were made available to customers while the configuring or policy definition was retained by the MSP. No solution allowed the MSPs to define the policies/rules in such a way that the customers could customize the rules as per their needs within the scope of the policies defined by the service provider.

SUMMARY

An object of the present invention is to allow an administrator higher up in a hierarchical arrangement to define the scope of policies for the services offered, and users lower in the hierarchical arrangement to customize the policies within the scope of policies thus defined.

Another object of the present invention is to provide customers with the ability for flexible service up gradation, independent of the service provider.

Yet another object of the present invention is to allow an administrator to define scoping rules where customizable services are to be provided, and to define non-scoping rules where customizable services are not to be provided, depending on degree of control to be exercised by the administrator.

The present invention is a system and method for allowing an administrator higher up in a hierarchical arrangement to define the scope of policies for the services offered, and users lower in the hierarchical arrangement to customize policies within the scope defined by the administrator. While defining policy rules, administrators classify them as scoping or non-scoping. Users lower in the hierarchical arrangement can then customize scoping rules by defining sub-rules. Policy rules have a condition part and an action part, and the sub-rules can be used to change the scope of the condition and action parts. The present invention adds all the non-scoping policy rules, all the scoping policy rules, and all the sub-rules (with their scope limited by the scoping rules) to a rules database. This rules database is then used by any policy enforcement engine to enforce policy rules.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which:

FIG. 3 is a table illustrating a scoping rule and four sub-rules defined for that scoping rule.

DESCRIPTION OF PREFERRED EMBODIMENTS

Figure 1:
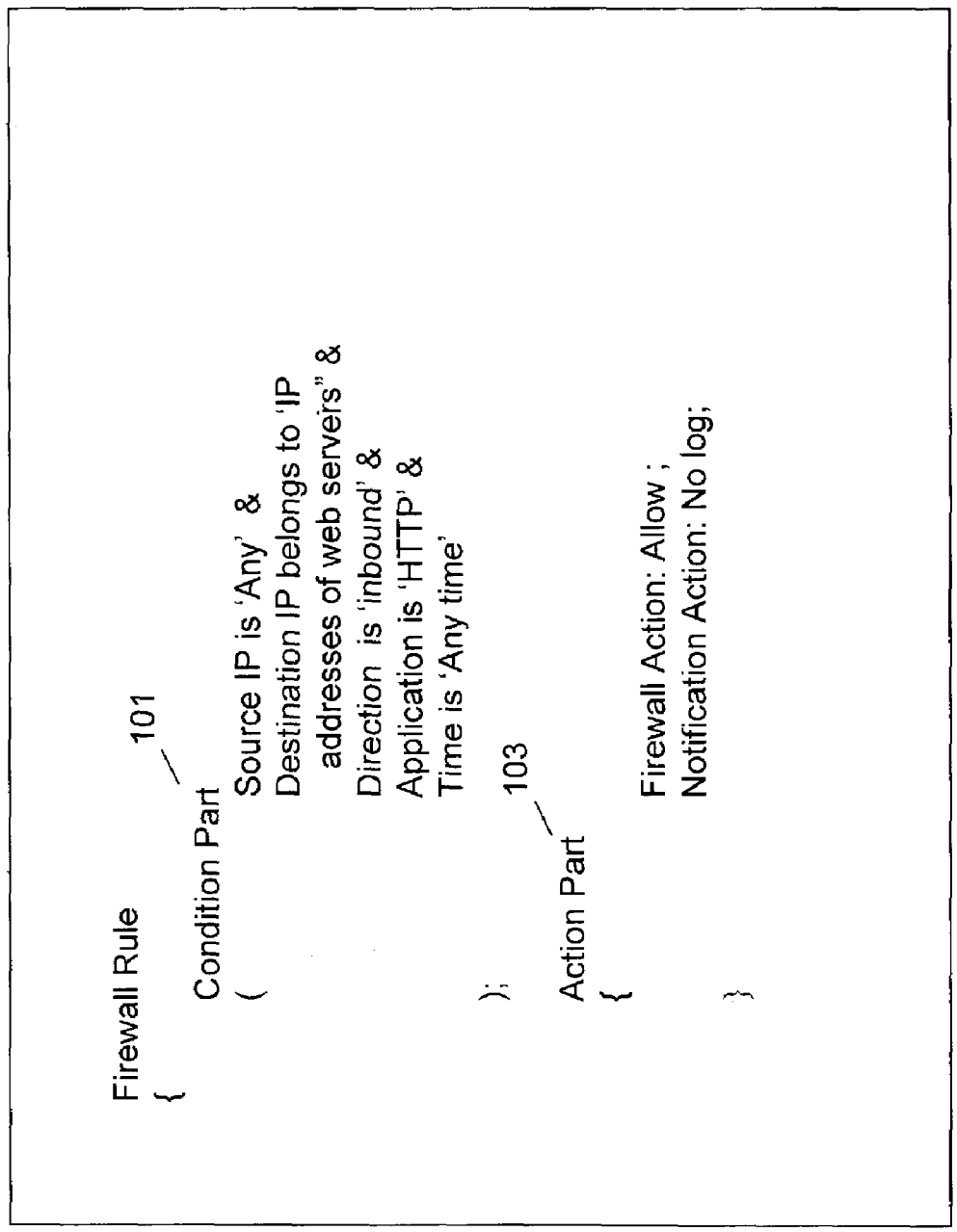
FIG. 1 illustrates an exemplary firewall policy rule and the condition and action parts of the rule.

For convenience, appropriate explanations of a number of terms used in the description of preferred embodiments are given below. It is to be understood that these explanations are given merely to aid better understanding of the description, and that they are not to be considered as limiting the scope of the invention claimed.

Definitions

Policy—A set of policy rules. For example, a security policy of an organization may consist of some firewall rules, virtual private networking rules, intrusion detection rules, HTTP URL filtering rules and others. All rules when applied together on the network traffic enforce the security policy of the organization on the network traffic.

Policy rule—A statement specifying a condition to be "matched" or "evaluated" on network traffic, and an action to be performed on the network traffic if a match occurs. A policy rule has two parts—a condition part and an action part.

Condition part—A statement specifying one or more conditions that are to be evaluated. A condition part is said to be "matched" if and only if all its conditions evaluate to "true".

Each condition is an object of an object class, and defines the domain of traffic for which the condition evaluates to "true". For example, a condition may be of object class "Source", and may define a set of source IP addresses. When the source IP address of some network traffic has one of the IP addresses from this defined set, this condition evaluates to "true".

Each object class has a network traffic attribute. An object of an object class has a set of values of the network traffic attribute of the object class. Examples of network attributes are Source IP address, Destination IP address, Time etc.

Action part—A statement specifying one or more actions that are to be taken. It is a part of policy rule, and is associated with a condition part. The action part is executed when the condition part associated with it evaluates to "true".

Domain of traffic of a condition—The network traffic for which the condition evaluates to "true".

Scope of a policy rule—The domain of traffic affected by the action part corresponding to the policy rule. It is the intersection of domains of traffic of all conditions of that rule.

For example, let $C_1$, $C_2$, $C_3$ ... $C_n$ be conditions of a policy rule where $C_n$ condition object defines set $S_n$ of values of network attribute $A_n$ $\{V_{n1}, V_{n2} ... V_{nm}\}$. Further, let $D_1$, $D_2$, $D_n$ be the domains of traffic for $C_1$, $C_2$, $C_n$, such that $D_n$ is the network traffic with value of network traffic attribute $A_n \epsilon S_n$. Then, the domain of traffic of a policy rule $D_r$ is the domain of traffic that is intersection of $D_1$, $D_2$, ... $D_n$. That is, $D_r = D_1 \cap D_2 ... D_n$ The present invention is a system and method that allows service providers to define the scope of policies for services offered, such that customers of the service providers can customize the policies within the scope thus defined by the service providers. Thereby, the customers can customize the policies independently of the service provider.

One embodiment of the present invention is envisaged to be operating along with a policy enforcement engine. Although the policy enforcement engine may be variously provided, a description of one such policy enforcement engine can be found in application Ser. No. 10/052,745 filed on Jan. 17, 2002, still pending and "Architecture for an Integrated Policy Enforcement System". It may however be evident to one skilled in the art that the present invention may also be adapted to operate with other policy enforcer agents.

The present invention may be embodied in a product such as the ipEnforcer 5000® as provided by iPolicy Networks Inc. of Fremont, Calif. This product is used to enforce management policies on networks, and is placed at a point where packets enter a network. Further, the present invention may be encoded in a programming language such as but not limited to C, C++, JAVA, PERL, Python, C# or Assembly.

FIG. 1 illustrates an exemplary firewall policy rule and the condition and action parts of the rule.

The condition part 101 consists of multiple conditions such as "Source IP", "Destination IP", and "Application". Each of the conditions is specified as an object of an object class. For instance, the "Source IP" object class defines the network attribute of the condition to be source IP address of the network traffic, and the "Source IP" object lists the value of source IP addresses against which the network traffic source IP address are to be matched. In this particular case, the condition is listing "any" source IP which means network traffic with any source IP will evaluate this condition as true.

Similarly, the "Destination IP" object class defines the network attribute of the condition to be destination IP address of the network traffic, and the "Destination IP" object lists the value of destination IP addresses against which the network traffic source IP address are to be matched. In this particular case, the condition is listing "belongs to IP address of web server", which means network traffic with the destination IP address of a web server will evaluate this condition as true.

Other object classes such as "Direction", "Application" and "Time", in the figure, define that "inbound" "HTTP" network traffic with "any time" will evaluate the corresponding condition as "true".

Further, the action part 103 consists of multiple actions such as "Firewall Action" and "Notification Action". The former defines that network traffic for which the condition part (all conditions of the condition part) is matched is to be allowed, while the latter defines that network traffic for which the condition part is matched is not to be logged.

Figure 2:
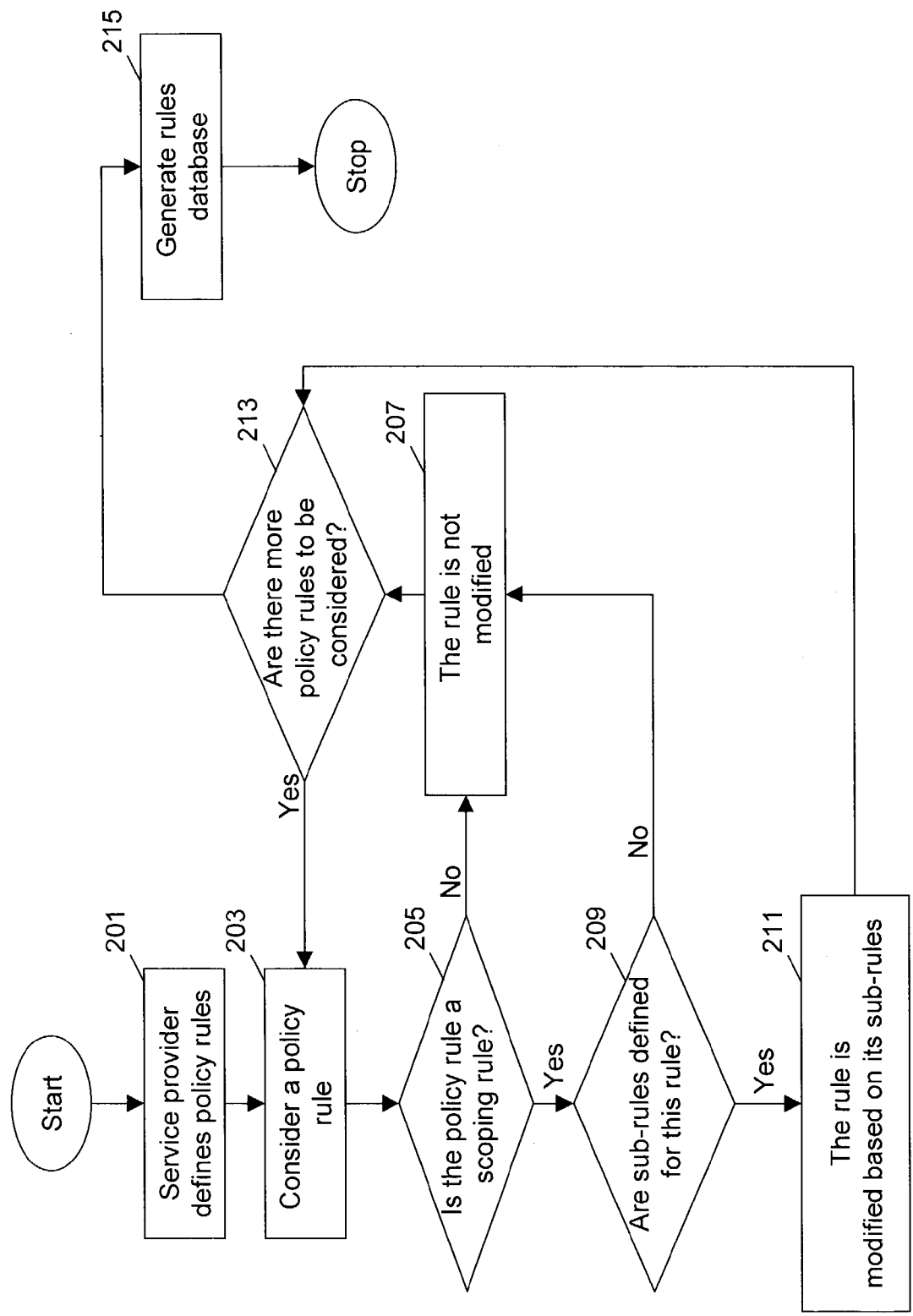
FIG. 2 is a flowchart illustrating the generation of a rules database according to an embodiment of the present invention.

FIG. 2 is a flowchart illustrating the generation of a rules database according to an embodiment of the present invention.

At step 201, a service provider defines policy rules. Each rule is associated with a scoping property, which denotes the rule as scoping or non-scoping. If a rule is defined as non-scoping, a customer cannot customize the rule. If a rule is defined as scoping, a customer can customize the rule, by defining sub-rules.

In one embodiment, the service provider can explicitly set rules as scoping or non-scoping.

In an alternate embodiment, the scoping/non-scoping property may be derived based on the context. The context based scoping/non-scoping property derived may be implementation specific such as inheritance of a rule by a customer that has been defined by service provider may make the rule a scoping rule in context of a customer for some implementations.

At step 203, a policy rule defined by the service provider is considered.

At 205, it is checked whether the policy rule being considered is a scoping rule.

If the considered rule is not scoping, at 207, the rule is not modified and is considered as it is for the rules database.

If the considered rule is scoping, at 209, it is checked if sub-rules are defined for the rule.

If sub-rules are defined for the scoping rule, at 211, the scoping rule is modified based on the sub rules. The concept of scoping is further explained in FIGS. 3 and 4.

If sub-rules are not defined for the scoping rule, at step 207, the scoping rule is not modified and considered as it is for rules database.

At 213, it is checked whether there are any more policy rules to be considered.

If there are more policy rules to be considered, step 203 is executed.

If there are no more rules to be considered, at 215, a rules database is generated. This rules database contains the policy rules as modified by the above steps, and is used by the policy enforcement engine to provide customized services to the customer. The rules database is generated, by adding all the non-scoping policy rules, all the scoping policy rules, and all the sub-rules (with their scope limited by the scoping rules).

Thus the present invention lets service providers define policies/rules for services offered, and mark certain rules as scoped rules. The policy enforcement engine then enforces the scoped policies/rules such that each customer is able to customize the service within the scope defined by the service provider. It allows customers to customize the services by letting them define sub-rules that are within the scope of the scoped rules defined by the service provider.

FIG. 3 is a table illustrating a scoping rule and four sub-rules defined for that scoping rule.

Referring to FIG. 3, rule 1 is an exemplary scoping rule that may be defined by a service provider, and sub-rules 1.1 to 1.4 are sub-rules that may be defined by a customer. In sub-rule 1.1, the Source IP address condition is a subset of Source IP address condition of scoping rule 1. In sub-rule 1.2, destination IP address condition is a subset of destination IP address condition of scoping rule 1. In sub-rule 1.3, the time condition is subset of time condition in scoping rule 1.

Figure 5:
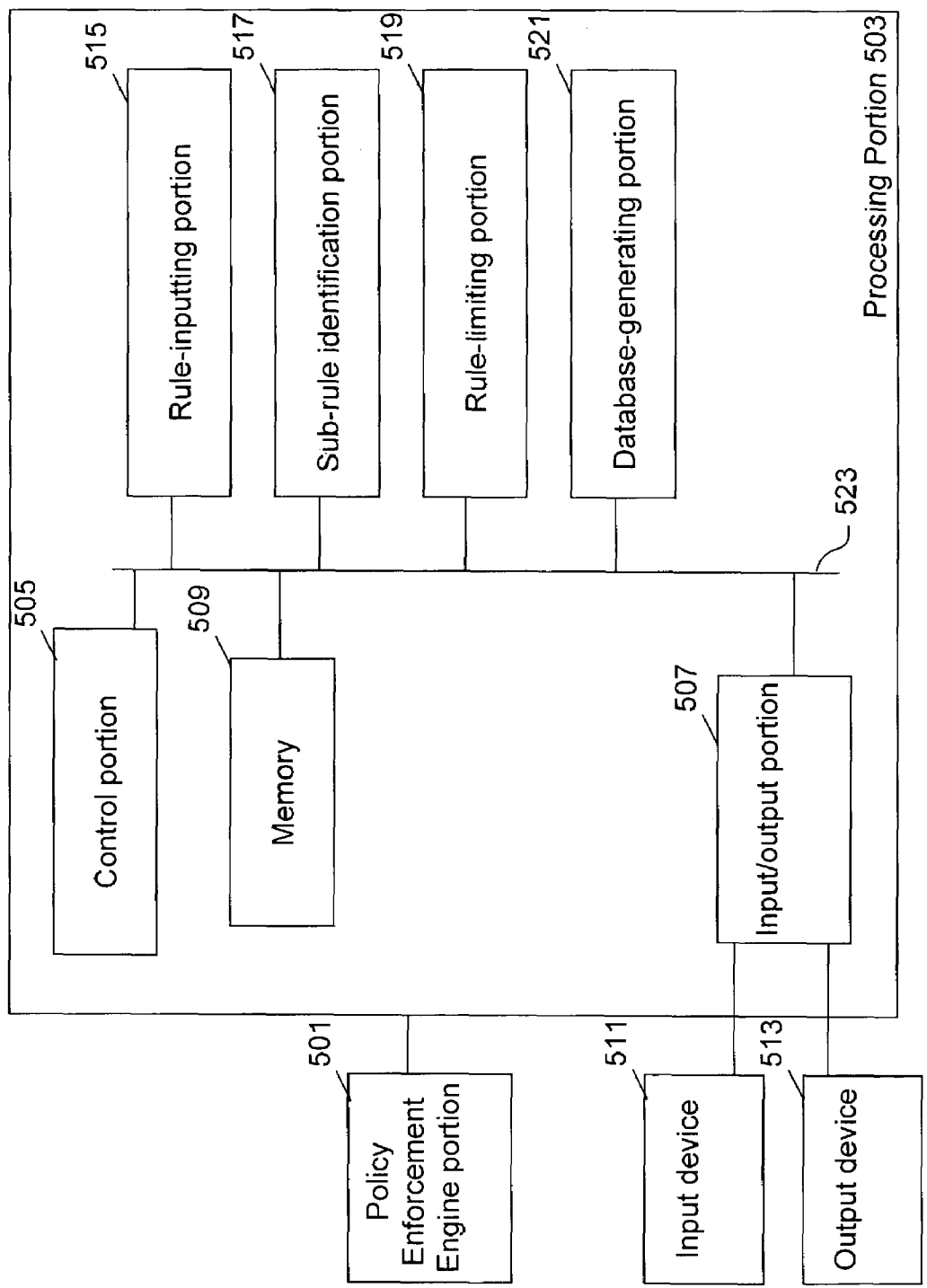
FIG. 5 is a block diagram of the system of the present invention, in accordance with one embodiment of the present invention.

The scoping condition (i.e. the condition in the sub-rule, which is a subset of the condition in the scoping rule) can either be ensured either at the time of input or while evaluating the rules for the network traffic. For example, the scoping condition for sub rule 1.1, 1.2, 1.3 is enforced at the time of input. A rule-limiting portion described in conjunction with FIG. 5 is responsible for limiting the scope of scoping rules based on their sub-rules.

In sub-rule 1.2, the input specification for the Firewall action is specified as 'not allowed', which is different from the Firewall action defined in scoping rule 1 which allows incoming network traffic from any source IP address and destined for 192.10.1.2 and 192.10.1.3 IP addresses. Since scoping rule 1 allows the network traffic matching conditions defined in scoping rule 1, customers can reject certain traffic allowed by the scoping rule by defining a sub rule with a reject action part. Thus, sub-rule 1.2 specified by a customer to reject network traffic destined for 192.10.1.2 and 192.10.1.3 IP addresses will be given the default treatment and rejected by a Policy enforcement portion. The role of the policy enforcement portion is described in conjunction with FIG. 5.

However, in sub-rule 1.4, the input specification of sub-rule allowed destination IP address is specified to be a different set from the destination IP addresses defined in scoping rule 1. Since 1.4 is a sub-rule, only 192.10.1.1 that has been specified by customer as destination IP address will be effective for rule evaluation, as the network traffic destined for 192.20.1.1 does not belong to domain of traffic for scoping rule 1. The network traffic destined for 192.20.1.1 does not belong to domain of traffic for scoping rule 1. Thus, the network traffic destined for 192.20.1.1 will be given the default treatment by the Policy enforcement portion. The Policy enforcement portion enforces the rules that have been limited by the rule-limiting portion as described in conjunction with FIG. 5. The default treatment may be implementation specific. Typically, for firewall the default action will be to drop the traffic. For other policies, the default action may be to drop the traffic and log it.

Figure 4:
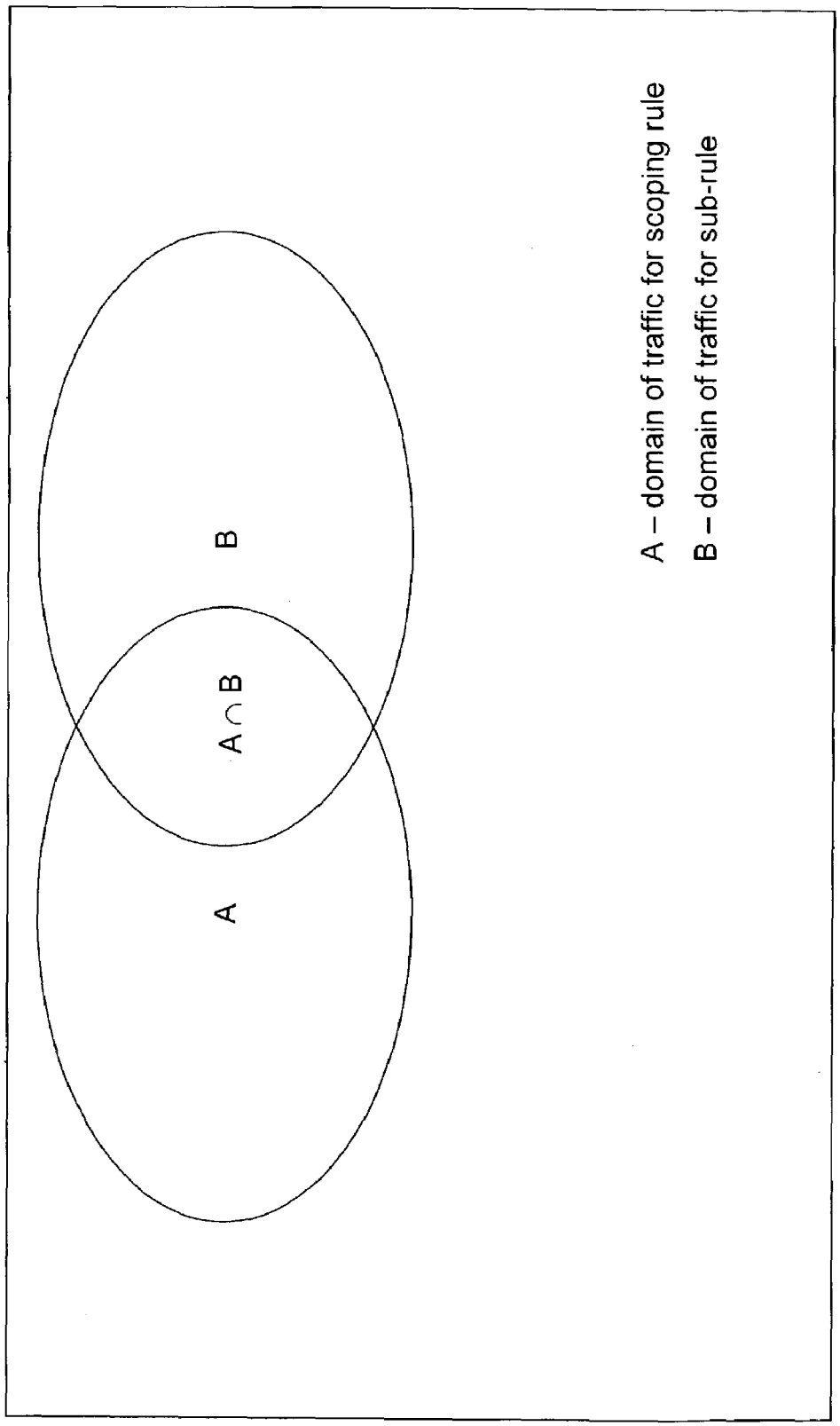
FIG. 4 is a Venn diagram illustrating the concept of domain of traffic of the scoping rules and domain of traffic of the sub-rules.

FIG. 4 is a Venn diagram illustrating the concept of domain of traffic of the scoping rules and domain of traffic of the sub-rules.

When a sub-rule is defined for a scoped rule, the sub-rule's domain of traffic is further scoped by the scoped rule's domain of traffic. Referring to FIG. 4, if A represents the domain of traffic for a scoping rule, and B represents the domain of traffic for the sub rule of the scoping rule, then the action part defined for the sub rule is applied only for the domain of traffic defined by A∩B. The rest of the B, i.e. B−(A∩B), is considered not to have matched sub rule (or scoped rule) and hence will get a default treatment. The scoping rule, therefore does not allow sub rules to have a domain of traffic more than the domain of traffic of scoping rule.

Thus, to summarize, as long as there are no sub rules defined for a scoping rule, the scoping rule is enforced on network traffic. Once one or more sub rules are defined for a scoping rule, the sub rules are enforced on the network traffic.

To understand the concept of scoping better, assume that a service provider defines a scoping rule that allows outgoing HTTP traffic from all hosts within the customer organization to any destination. Since this is a scoping rule, customers can create sub-rules that restrict outgoing HTTP traffic to any destination for only a limited number of hosts, and outgoing HTTP traffic to some limited destinations for all hosts within the customer organization by defining two sub rules to this scoping rule. Customers, however, cannot create sub-rules that allow outgoing FTP traffic since the scoping rule permits only HTTP traffic. Thus while customers can refine the policy laid down by the service provider of allowing outgoing HTTP traffic, it is not possible to add new rules overriding the policy laid down by the service provider.

Further, a sub-rule is not limited to simply modifying the scope. A sub-rule can even modify the action defined by the action part of the scoping rule. For example, assume a scoping rule that accepts all incoming HTTP traffic to all destination IP addresses. Since this is a scoping rule, customers can reject certain traffic allowed by the scoping rule by defining a sub rule with a reject action part. Customers can also create sub-rules to reject a subset of the traffic allowed by the scoping rule, by writing two sub-rules. One of these sub-rules would reject the subset of the traffic, and the other would allow the full traffic.

It is to be noted that this concept can be extended to other types of policy-based rules also. For example, in case of a QoS rule, customers can limit the bandwidth available to domain of traffic of a sub rule to the bandwidth specified in action part of scoping rule.

FIG. 5 is a block diagram of the system of the present invention, in accordance with one embodiment of the present invention.

FIG. 5 shows a policy enforcer portion 501, and a processing portion 503 of the system.

Processing portion 503 includes various components, namely a control portion 505, an input/output portion 507 and a memory 509. Control portion 505 controls overall operations of processing portion 503, such as coordinating the operation of the various components. Input/output portion 507 inputs and outputs a variety of data in conjunction with input device 511 and output device 513, respectively. For example, input device 511 might be a scanning device, a keyboard, a mouse or a device to provide connection to the Internet. Output device 513 might be simply a monitor or a database.

Processing portion 503 further includes a rule-inputting portion 515, a sub-rule identification portion 517, a rule-limiting portion 519, and a database-generating portion 521.

Rule-inputting portion 515 is responsible for getting rules and sub-rules from administrators and customers, and is able to define and identify scoping and non-scoping rules. Essentially, rule-inputting portion 515 performs steps 201 to 207 and 213 of FIG. 2.

Sub-rule identification portion 517 is responsible for identifying rules that have sub-rules, and performs step 209 of FIG. 2.

Rule-limiting portion 519 is responsible for limiting the scope of scoping rules based on their sub-rules. Essentially, rule-inputting portion 519 performs step 211 of FIG. 2.

Database-generating portion 521 is responsible for generating the rules database. It operates in conjunction with input/output portion 507 to create the rules database. Essentially, database-generating portion 521 performs step 215 of FIG. 2.

The various components of processing portion 503 are connected using a suitable interface 523, such as a bus.

Further, processing portion is supported by a policy enforcer portion 501, which enforces the rules in the rules database.

It may be noted that while this document illustrates the concept of scoping rule and sub rule in context of service provider and its customer, the concept is applicable for any organization and its sub-organization such as a company and department or a company corporate office and a company location. Further, the present invention may be implemented to allow for hierarchical management. The customer of the present invention may be providing services on a wholesale basis to other service providers that directly serve their own end customers.

In the foregoing specification, the invention has been described with reference to specific exemplary embodiments thereof. Other embodiments will be apparent to those of ordinary skill in the art. Further, while the present invention has been described using a particular combination of hardware and software, it should be recognized that other combinations of hardware and software are also within the scope of the present invention. The present invention may be implemented only in hardware or only in software or using combinations thereof.

The system, as described in the present invention or any of its components may be embodied in the form of a processing machine. Typical examples of a processing machine include a general-purpose computer, a programmed microprocessor, a micro-controller, a peripheral integrated circuit element, and other devices or arrangements of devices, which are capable of implementing the steps that constitute the method of the present invention.

The processing machine executes a set of instructions that are stored in one or more storage elements, in order to process input data. The storage elements may also hold data or other information as desired. The storage element may be in the form of a database or a physical memory element present in the processing machine.

The set of instructions may include various instructions that instruct the processing machine to perform specific tasks such as the steps that constitute the method of the present invention. The set of instructions may be in the form of a program or software. The software may be in various forms such as system software or application software. Further, the software might be in the form of a collection of separate programs, a program module with a larger program or a portion of a program module. The software might also include modular programming in the form of object-oriented programming. The processing of input data by the processing machine may be in response to user commands, or in response to results of previous processing or in response to a request made by another processing machine.

A person skilled in the art can appreciate that it is not necessary that the various processing machines and/or storage elements be physically located in the same geographical location. The processing machines and/or storage elements may be located in geographically distinct locations and connected to each other to enable communication. Various communication technologies may be used to enable communication between the processing machines and/or storage elements. Such technologies include connection of the processing machines and/or storage elements, in the form of a network. The network can be an intranet, an extranet, the Internet or any client server models that enable communication. Such communication technologies may use various protocols such as TCP/IP, UDP, ATM or OSI.

In the system and method of the present invention, a variety of "user interfaces" may be utilized to allow a user to interface with the processing machine or machines that are used to implement the present invention. The user interface is used by the processing machine to interact with a user in order to convey or receive information. The user interface could be any hardware, software, or a combination of hardware and software used by the processing machine that allows a user to interact with the processing machine. The user interface may be in the form of a dialogue screen and may include various associated devices to enable communication between a user and a processing machine. It is contemplated that the user interface might interact with another processing machine rather than a human user. Further, it is also contemplated that the user interface may interact partially with other processing machines while also interacting partially with the human user.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method for providing a customer of a computer network the ability to customize policies defined by an administrator, the customization of policies being carried out independently of the administrator, the customer performing the customization of policies in order to receive customized services from the administrator, wherein a policy is a set of policy rules, each of the set of policy rules including a condition part and an action part, the condition part specifying at least one condition to be matched on network traffic, wherein the action part specifying an action to be performed on the network traffic, the method comprising the steps of:

a. defining a policy rule by the administrator;
   b. classifying the policy rule as scoping or non-scoping policy rule by the administrator irrespective of the customer, the scoping policy rule being a policy rule that can be customized by the customer and the non-scoping policy rule being a policy rule that cannot be customized by the customer;
   c. customizing the policy rule if the policy rule is defined as the scoping policy rule, wherein customizing the policy rule includes defining sub-rules to the policy rule, the sub-rules being policy rules defined within the scope of the policy rule, the scope of the policy rule being defined as the domain of network traffic affected by the action part of the policy rule; and
   d. generating a rules database on the basis of the customized policy rules, the customized policy rules being enforced by a policy enforcement engine to provide customized services to the customer, wherein the step of generating the rules database comprises the steps of:
  i. inputting the policy rule;
  ii. adding the policy rule to the rules database if the policy rule is defined as the non-scoping policy rule;
  iii. checking if the sub-rules are defined for the policy rule if the policy rule is defined as the scoping policy rule;
  iv. adding the policy rule to the rules database if the policy rule has no sub-rules;
  v. modifying the scoping policy rule on the basis of the defined sub-rules if the policy rule has sub-rules; and
  vi. adding the modified scoping policy rule to the rules database.

2. The method as recited in claim 1, wherein the step of defining the sub-rules comprises the step of defining the sub-rules by the customer to modify the action part of the policy rule.

3. The method as recited in claim 1, wherein the step of defining the sub-rules comprises the step of defining the sub-rules by the customer to modify the domain of network traffic of the condition part of the policy rule.

4. The method as recited in claim 1, wherein the step of generating the rules database comprises a step of creating a default action part for network traffic not belonging to the domain of network traffic.

5. The method as recited in claim 1, wherein the step of customizing the policy rule comprises the step of limiting the domain of network traffic of the condition part of the policy rule to the intersection of the domain of network traffic of the condition part of the policy rule and the domain of network traffic of the condition parts of the sub-rules of the policy rule.

6. The method as recited in claim 1, wherein the method is embodied in a computer program for use as a stored program in a computer.

7. A computer program product embodied in a computer readable medium, for providing a customer of a computer network the ability to customize policies defined by an administrator, the customization of policies being carried out independently of the administrator, the customer performing the customization of policies in order to receive customized services from the administrator, a policy being a set of policy rules, each of the set of policy rules including a condition part and an action part, the condition part specifying at least one condition to be matched on network traffic, wherein the action part specifying an action to be performed on the network traffic, the computer program product comprising:
  a. program instruction means for defining a policy rule by the administrator;
  b. program instruction means for classifying the policy rule as scoping or non-scoping policy rule by the administrator irrespective of the customer, the scoping policy rule being a policy rule that can be customized by the customer and the non-scoping rule being a policy rule that cannot be customized by the customer;
  c. program instruction means for customizing the policy rule if the policy rule is defined as the scoping policy rule, wherein the customizing of the policy rule is defining sub-rules to the policy rule, the sub-rules being policy rules defined within the scope of the policy rule, the scope of the policy rule being defined as the domain of network traffic affected by the action part of the policy rule; and
  wherein program instructions means for defining the sub-rules to the policy rule comprises:
    i. program instruction means for defining sub-rules to modify the domain of network traffic of the condition part of the policy rule; and
    ii. program instruction means for defining sub-rules to modify the action part of the policy rule;
  d. program instruction means for generating a rules database on the basis of the customized policy rules, whereby the customized policy rules are enforced by a policy enforcement engine to provide customized services to the customer
  wherein the program instruction means for generating the rules database comprises the steps of:
    i. program instruction means for inputting a policy rule;
    ii. program instruction means for adding the policy rule to the rules database if the policy rule is defined as a non-scoping policy rule;
    iii. program instruction means for checking if the sub-rules are defined for the policy rule if the policy rule is defined as a scoping policy rule;
    iv. program instruction means for modifying the policy rule on the basis of the defined sub-rules; and
    v. program instruction means for adding the modified policy rule to the rules database.

8. The computer program product as recited in claim 7, wherein the program instruction means for modifying the policy rule comprises limiting the domain of network traffic of condition parts of the policy rule to the intersection of the domain of network traffic of the condition part of the policy rule and the domain of network traffic of the condition parts of the sub-rules of the policy rule.

9. The computer program product as recited in claim 7, wherein the program instruction means for generating the rules database add the policy rule to the rules database if the policy rule has no sub-rules.

10. The computer program product as recited in claim 7, wherein the program instruction means for generating the rules database creates a default action part for network traffic not belonging to the domain of network traffic for any policy rule.

11. A method for providing a customer of a computer network the ability to customize policies defined by an administrator, the customization of policies being carried out independently of the administrator, the customer performing the customization of policies to receive customized services from the administrator, a policy being a set of policy rules, each of the set of policy rules including a condition part and an action part, the condition part specifying at least one condition to be matched on network traffic, wherein the action part specifying an action to be performed on the network traffic, the method comprising the steps of:
  a. defining a policy rule by the administrator;
  b. classifying the policy rule as scoping or non-scoping policy rule by the administrator irrespective of the customer, the scoping policy rule being a policy rule that can be customized by a customer and the non-scoping rule being a policy rule that cannot be customized by the customer;
  c. customizing the policy rule if the policy rule is defined as the scoping policy rule, wherein customizing the policy rule comprises defining sub-rules to the policy rule, the sub-rules being policy rules defined within the scope of the policy rule, the scope of the policy rule being defined as the domain of network traffic affected by the action part of the policy rule; and wherein the step of defining the sub-rules to the policy rule comprises the steps of:
  i. defining sub-rules to modify the domain of network traffic of the condition part of the policy rule; and
  ii. defining sub-rules to modify the action part of the policy rule;
d. generating a rules database on the basis of the customized policy rules, the customized policy rules being enforced by a policy enforcement engine to provide customized services to the customer;
wherein the step of generating the rules database comprises the steps of:
  i. inputting a policy rule;
  ii. adding the policy rule to the rules database if the policy rule is defined as a non-scoping policy rule;
  iii. checking if the sub-rules are defined for the policy rule if the policy rule is defined as a scoping rule;
  iv. modifying the policy rule on the basis of the defined sub-rules; and
  v. adding the modified policy rule to the rules database.

12. The method as recited in claim 11, wherein the step of generating the rules database comprises the step of creating a default action part for network traffic not belonging to the domain of network traffic for any policy rule.

13. The method as recited in claim 11, wherein the step of customizing the policy rule comprises the step of limiting the domain of network traffic of the condition part of the policy rule to the intersection of the domain of network traffic of the condition part of the policy rule and the domain of network traffic of the condition parts of the sub-rules of the policy rule.

14. The method as recited in claim 11, wherein the step for generating the rules database adds the policy rule to the rules database if the policy rule has no sub-rules.

* * * * *